May 6, 1952 — J. R. COX — 2,595,828
COLLET
Filed Aug. 9, 1946

INVENTOR.
JOHN R. COX
BY Richey & Watts
ATTORNEYS

Patented May 6, 1952

2,595,828

UNITED STATES PATENT OFFICE 2,595,828

COLLET

John R. Cox, Cleveland, Ohio, assignor to The Balas Collet Manufacturing Co., Cleveland, Ohio, a partnership Application August 9, 1946, Serial No. 689,412

3 Claims. (Cl. 279—46)

This invention relates to improvements in collets of the type used in machine tools.

The primary object of the invention is to provide a collet which will effect the operative support of either round or rectangular bar stock of congruent size.

More specifically, the invention contemplates a spring collet of the general form used in screw machines, lathes, milling machines and similar mechanisms save that the stock gripping fingers in the collet are bored for engagement with round bar stock and, in addition, broached for engagement with the corners of polygonal bars.

Further objects of the invention reside in the provision of a structure which is adapted for use in either "draw in" or "push" type collets, a spring chuck which is efficient of operation and a structure which is economically manufactured.

Other objects and advantages more or less ancillary to the foregoing and the manner in which all of the various objects are realized will appear in the following description, which, considered in connection with the accompanying drawings, sets forth the preferred embodiment of the invention:

Figure 1:
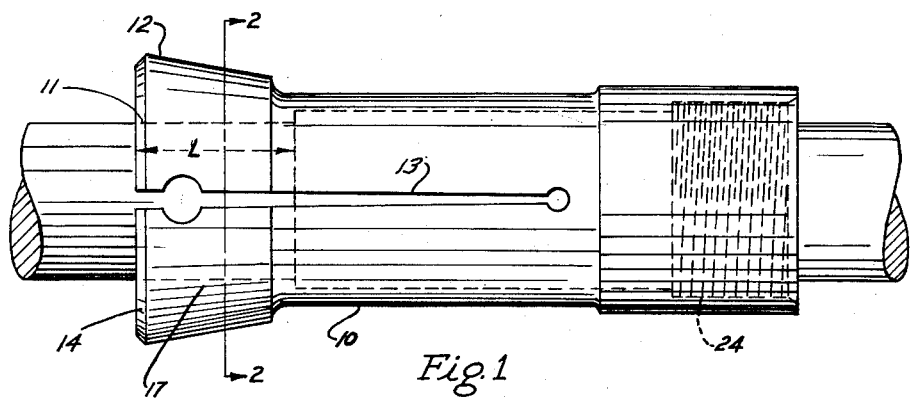
Fig. 1 is a side elevation of the collet embodying the invention.

As illustrated in Fig. 1, the collet comprises a tubular body 10 formed in the conventional manner with a diametrically reduced bore 11 in one end thereof, a conical head 12 surrounding the bore and a plurality of longitudinal kerfs 13 in the end of the tube which define the stock gripping fingers 14.

Figure 3:
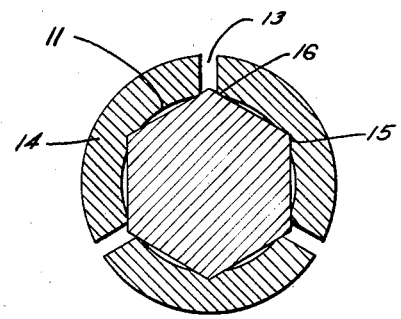
Fig. 3 is a similar view of the collet having a hexagonal bar therein.

The bore 11 in the outer end of the collet is of circular transverse section interrupted as shown with a plurality of broached V-grooves 15 configured to engage adequate portions of the corners of the stock to effect the rigid support thereof and avoid mutilation of the corners of the bars consequent the torsional loads imposed thereon during a turning or milling operation. The kerfs 13 may be arranged in aligned relation with certain of the grooves 15 in which case the inner edges of the walls defining the slots are machined to form bearing faces 16 (Figs. 3 and 5) or if desired, the collet may be formed with a greater number of kerfs so that greater areas of engagement may be provided by the grooves (Figs. 4 and 5).

Figure 2:
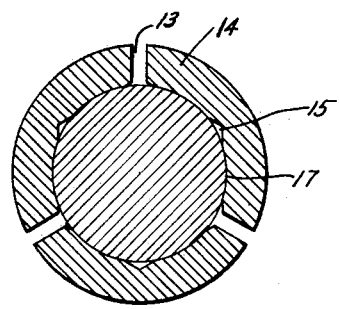
Fig. 2 is a transverse section through the collet illustrated in Fig. 1 having a bar of round bar stock therein.

In the embodiment illustrated in Fig. 2, the grooves 15 are formed for the support of hexagonal bar stock, the unbroached portions of the bore 11 in the throat of the collet being designed to provide six arcuate stock gripping pads 17, each of an arcuate length substantially equal to one-half the width of a side of the hexagon fitting in grooves 15 the sum of said arcuate lengths equaling approximately one-half the circumference of the circle defined by the bore 11. By increasing the length of the bearing pads 17 (dimension L, Fig. 1) over that customarily employed in collets of a conventional form, the gripping area of the pads may be made equal thereto. By way of illustration of the relation between the dimensions of the hexagonal-cylinder profile as described above, a collet may be formed with a twenty-three/thirty-seconds of an inch bore therein and a broached opening to receive hexagonal stock, eleven-sixteenths of an inch across flats.

Figure 4:
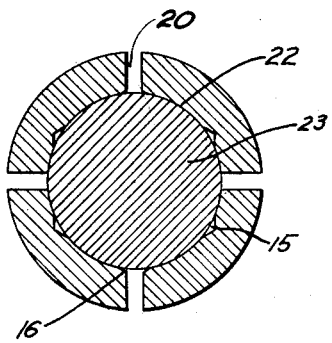
Fig. 4 is an end elevational view of an alternate construction of the stock gripping fingers illustrating a round bar of stock in the collet.
Figure 5:
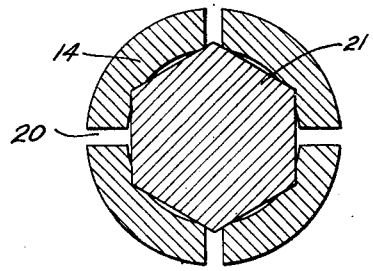
Fig. 5 is a similar view of the collet illustrated in Fig. 4 having a hexagonal bar therein.

In the embodiment illustrated in Figs. 4 and 5, the collet is formed with diametrically opposed kerfs 20, one pair thereof being disposed in a plane common to the major transverse axis of the hexagonal bar to be supported therein. In this design, the total lineal bearing upon the hexagonal bar 21 is equal to approximately one-half the perimeter of the transverse section thereof and the total lineal engagement of the gripping pads 22 for round bar stock 23 exceeds one-half the circumference of the bar.

Considering the geometric layout of the design, the profile of the polygonal work piece may first be outlined then a circle drawn, the circle being struck from a radius which will intersect the sides of the polygon and define arcs which, when taken accumulatively, equal substantially one-half the circumference of the circle.

The inner end of the collet may be formed with a threaded end portion 24 for engagement with the draw tube associated with the collet actuating mechanism and the portion of the tube surrounding the threaded end may be ground for sliding engagement in the collet sleeve. Since, however, these and other structural details of the inner end of the collet form no part of the present invention, further description is deemed unnecessary herein.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A collet comprising a sleeve kerfed to form stock-gripping pads, the stock-gripping walls of said pads being segments of a cylinder interrupted by planar surfaces whose walls extended would form a regular polygon, the accumulated peripheral length of the planar surfaces of said pads being substantially equal to the accumulated circumference of the cylindrical segments of the pads.

2. A collet comprising a sleeve kerfed to form stock-gripping pads, the stock-gripping walls of said pads being segments of a cylinder interrupted by planar surfaces whose walls extended would form a hexagon, the total arcs of the cylindrical segments substantially equalling 180°, the accumulated peripheral lengths of the planar surfaces of said pads being substantially equal to the accumulated circumference of the cylindrical segments of the pads.

3. A collet comprising a sleeve equidistantly kerfed to form stock-gripping pads, the stock-gripping walls of said pads being segments of a cylinder interrupted by planar surfaces whose walls extended would form a regular polygon, the polygon defined by the extension of said planar surfaces being oriented relative to the kerfs so that at least two corners of the polygon intersect the cylinder at kerfs with the edges of the pads at the kerfs being beveled, there being a blind V-shaped recess in each pad between the kerfs corresponding to other corners of the polygon, the accumulated peripheral length of the planar surfaces of said pads being substantially equal to the accumulated circumference of the cylindrical segments of the pads.

JOHN R. COX.

REFERENCES CITED

The following references are of record in the file of this patent:

UNITED STATES PATENTS

| Number | Name | Date |
|---|---|---|
| 1,473,188 | Kromp et al. | Nov. 6, 1923 |
| 1,538,442 | Mann | May 19, 1925 |
| 1,597,404 | Crossley | Aug. 24, 1926 |
| 2,214,241 | Baxendale | Sept. 10, 1940 |
| 2,272,185 | Chittenden | Feb. 10, 1942 |